(12) United States Patent
Tofukuji et al.

(10) Patent No.: US 12,320,733 B2
(45) Date of Patent: Jun. 3, 2025

(54) TISSUE PIECE TREATING APPARATUS

(71) Applicants: SAKURA SEIKI CO., LTD., Nagano (JP); SAKURA FINETEK JAPAN CO., LTD., Tokyo (JP)

(72) Inventors: Tadashi Tofukuji, Nagano (JP); Moe Okabe, Nagano (JP)

(73) Assignees: SAKURA SEIKI CO., LTD., Nagano (JP); SAKURA FINETEK JAPAN CO., LTD., Tokyo (JP)

( * ) Notice: Subject to any disclaimer, the term of this patent is extended or adjusted under 35 U.S.C. 154(b) by 710 days.

(21) Appl. No.: 17/771,795

(22) PCT Filed: Oct. 13, 2020

(86) PCT No.: PCT/JP2020/038553
§ 371 (c)(1),
(2) Date: Apr. 25, 2022

(87) PCT Pub. No.: WO2021/085108
PCT Pub. Date: May 6, 2021

(65) Prior Publication Data
US 2022/0373438 A1 Nov. 24, 2022

(30) Foreign Application Priority Data
Oct. 30, 2019 (JP) .................. 2019-197083

(51) Int. Cl.
G01N 1/31 (2006.01)
G01N 1/36 (2006.01)
G01N 1/44 (2006.01)

(52) U.S. Cl.
CPC ................ *G01N 1/31* (2013.01); *G01N 1/36* (2013.01); *G01N 1/44* (2013.01); *G01N 2001/315* (2013.01)

(58) Field of Classification Search
CPC ........... B29B 11/16; B29L 23/00; G01N 1/31; G01N 1/36; G01N 1/44; G01N 1/28; G01N 1/30; G01N 33/48
See application file for complete search history.

(56) References Cited

U.S. PATENT DOCUMENTS

2005/0124028 A1   6/2005   Windeyer et al.
2009/0011425 A1   1/2009   Delaage et al.
(Continued)

FOREIGN PATENT DOCUMENTS

JP   2001194276 A   7/2001
JP   2003057156 A   2/2003
(Continued)

OTHER PUBLICATIONS

Related Application, PCT Int'l Search Report for PCT/JP2020/038553, Sakura Seiki Col, Ltd. and Sakura Finetek Japan Co., Ltd., Dated Aug. 12, 2020.
(Continued)

*Primary Examiner* — Jennifer Wecker
*Assistant Examiner* — Jonathan Bortoli
(74) *Attorney, Agent, or Firm* — William Thomas Babbitt

(57) ABSTRACT

A tissue piece treating apparatus including: a treating tank in which immersion of a tissue piece is performed by a chemical solution being supplied thereto; a communication passage connected to the treating tank; one or a plurality of chemical solution bottles connected to the communication passage; and a pump operable to cause the treating tank to be at a negative pressure to supply the chemical solution from the chemical solution bottle to the treating tank, and operable to cause the treating tank to be at a positive pressure to discharge the chemical solution from the treating tank to the chemical solution bottle, in which the communication passage, which partially branches, includes an
(Continued)

outside air port that communicates with an outside air, the air port configured to supply and discharge the outside air to and from the inside of the treating tank by receiving an action of the pump.

5 Claims, 2 Drawing Sheets

(56) References Cited

U.S. PATENT DOCUMENTS

2017/0058245 A1    3/2017   Shah et al.
2018/0230454 A1    8/2018   Wang

FOREIGN PATENT DOCUMENTS

| | | |
|---|---|---|
| JP | 2007509354 A | 4/2007 |
| JP | 2015001512 A | 1/2015 |
| WO | WO2011139976 A1 | 11/2011 |

OTHER PUBLICATIONS

Related Application, Sakura Seiki Col, Ltd. and Sakura Finetek Japan Co., Ltd., Extended European Search Report for Int'l Appl. No. 20883127.1-1001 / 3988919 PCT/JP202003855; Dated Jul. 6, 2022.

TISSUE PIECE TREATING APPARATUS

CROSS-REFERENCE TO RELATED APPLICATIONS

The present Application is a national stage of International Patent Application No. PCT/JP2020/038553, titled "Tissue Piece Treating Apparatus," filed Oct. 13, 2020 which claims priority from Japanese Patent Application No. 2019-197083, filed Oct. 30, 2019, the contents of which are incorporated in this disclosure by reference in their entirety.

TECHNICAL FIELD

The present invention relates to a tissue piece treating apparatus, and more specifically relates to a tissue piece treating apparatus that performs treatment necessary for producing a microscopic specimen of a tissue piece collected from a living thing including a human body.

BACKGROUND ART

As a pretreatment for observing a tissue piece (sample) collected from a living thing with a microscope, specimen production treatment in which fixing treatment, dehydrating treatment, degreasing treatment, and permeating treatment (embedding treatment) are performed in this order is performed. A tissue piece treating apparatus that automatically performs the treatment has been widely used (see, PTL 1: JP-A-2015-1512).

The specimen production treatment is performed in such a manner that a tissue piece is successively immersed into a chemical solution in accordance with each treatment, and in the tissue piece treating apparatus, to a treating tank (retort) in which a tissue piece is housed, chemical solutions in a plurality of provided chemical solution bottles are supplied in a prescribed order, and are held in a certain period of time. Therefore, immersion treatment of the tissue piece can be performed. The chemical solutions subjected to the immersion treatment are respectively returned to original chemical solution bottles, and are repeatedly used until it is determined that the chemical solutions are unavailable. Moreover, with respect to the empty treating tank to which the specimen production treatment has been completed and from which the tissue piece has been taken, chemical solutions are supplied in a prescribed order so that the inside thereof is cleaned and then is dried. This allows the empty treating tank to be used in the next specimen production treatment.

CITATION LIST

Patent Literature

PTL 1: JP-A-2015-1512

SUMMARY OF INVENTION

Technical Problem

In the conventional tissue piece treating apparatuses, the drying treatment in an inside of a treating tank has been performed by the gas exchange in the inside of the treating tank by a pump that is connected to the treating tank through a pipeline. However, the pump is originally provided as a member that pressurizes and decompresses the inside of the treating tank when a chemical solution is transported between the treating tank and the chemical solution bottle. Accordingly, the gas exchange action by the pump is an action for merely attaining the purpose of pressurizing and decompressing the inside of the treating tank, and thus has been relatively weak. Accordingly, the gas exchange action does not sufficiently act on the drying in the inside of the treating tank, so that there has been a problem that the drying in the inside of the treating tank is difficult to be promoted. Moreover, the inside of the treating tank at the drying is filled with alcohol gas and the like. Accordingly, there has been another problem that the insufficient gas exchange in the inside of the treating tank causes a risk of inflammation in a case where the inside of the treating tank is ignited due to an accident or the like.

Solution to Problem

The present invention is made in view of the abovementioned circumstances, and aims to provide a tissue piece treating apparatus in which the drying in the inside of the treating tank is promoted, compared with the conventional tissue piece treating apparatus, and the gas in the inside of the treating tank is discharged so that the risk of inflammation can be prevented.

The present invention solves the problem by a solution as described below, as one embodiment.

A tissue piece treating apparatus according to the present invention needs to have such a configuration that the tissue piece treating apparatus includes: a treating tank in which a tissue piece is operable to be housed, and immersion of the tissue piece is performed by a chemical solution being supplied thereto; a communication passage that is connected to the treating tank; one or a plurality of chemical solution bottles that are connected to the treating tank through the communication passage, and store chemical solutions to be supplied to the treating tank; and a pump that causes an inside of the treating tank to be a negative pressure to supply the chemical solution from the chemical solution bottle to the inside of the treating tank, and causes the inside of the treating tank to be a positive pressure to discharge the chemical solution from the inside of the treating tank to the chemical solution bottle, in which the communication passage includes, by partially branching, an outside air port that communicates with an outside air, and is thus configured to be able to supply and discharge the outside air to and from the inside of the treating tank by receiving an action of the pump.

With this, it is possible to include the outside air port that communicates with the outside air by branching the communication passage to be connected to the treating tank. Accordingly, by the action of pressurizing and decompressing the inside of the treating tank by the pump, the outside air taken from the outside air port can be supplied to the inside of the treating tank through the communication passage, and the gas in the inside of the treating tank can be discharged through the communication passage from the outside air port to the outside of the tissue piece treating apparatus, in other words, in the atmosphere. As a result, it is possible to flow the more gas through the inside and the outside of the treating tank than the conventional configuration, promote the drying in the inside of the treating tank by enhancing the gas exchange action in the inside of the treating tank, and prevent the risk of inflammation by enhancing the gas discharge action in the inside of the treating tank.

Moreover, the tissue piece treating apparatus preferably includes a heating unit, being disposed in the communication passage, and being disposed between the treating tank and the outside air that is communicated via the outside air port. With this, it is possible to heat the outside air that flows through the communication passage, and supply the warm air to the inside of the treating tank. Accordingly, drying in the inside of the treating tank can be further promoted.

Moreover, preferably, the communication passage includes a selection valve to which a plurality of selection ports are provided, and a central pipeline that connects the selection valve to the treating tank, and chemical solution ports that are connected on a one-to-one basis to the plurality of the chemical solution bottles, and the outside air port are disposed in the selection port, so that the chemical solution in one chemical solution bottle selected from the plurality of the chemical solution bottles is configured to be able to be supplied and discharged to and from the inside of the treating tank, and the outside air is configured to be able to be supplied and discharged to and from the inside of the treating tank. With this, by the operation by the selection valve, it is possible to select the chemical solution port or the outside air port, communicate the chemical solution bottle or the outside of the tissue piece treating apparatus to the treating tank, and supply and discharge the chemical solution or the outside air to and from the inside of the treating tank. Accordingly, the outside air port is additionally disposed to one of the plurality of the selection ports provided to the selection valve, so that the outside air port can be provided easily, and the manufacturing cost can be suppressed.

Moreover, preferably, an oven that heats paraffin is provided, and a part or all of the central pipeline or the outside air port is laid in an inside or a vicinity of the oven. This allows the oven to act as the heating unit, and heat the outside air taken from the outside air port (the outside air opening) by the heat from the oven.

Moreover, the outside air port preferably includes an filter that cleans air. This allows the outside air taken from the outside air port (the outside air opening) to be cleaned by passing the outside air through the filter. Accordingly, it is possible to supply the clean air to the inside of the treating tank, and prevent the inside of the treating tank after cleaning from being re-contaminated by impurities contained in the outside air.

Moreover, a tissue piece treating apparatus according to the present invention needs to have such a configuration that the tissue piece treating apparatus includes: a treating tank in which a tissue piece is operable to be housed, and immersion of the tissue piece is performed by a chemical solution being supplied thereto; an outside air pipeline that communicates the treating tank with an outside air; and a pump that causes an inside of the treating tank to be a negative pressure or a positive pressure, in which the outside air pipeline is configured to be able to supply and discharge the outside air to and from the inside of the treating tank by receiving an action of the pump.

With this, by the action of pressurizing and decompressing the inside of the treating tank by the pump, the outside air taken from the outside air pipeline can be supplied to the inside of the treating tank, and the gas in the inside of the treating tank can be discharged through the outside air pipeline to the outside of the tissue piece treating apparatus, in other words, in the atmosphere. As a result, it is possible to flow the more gas through the inside and the outside of the treating tank than the conventional configuration, promote the drying in the inside of the treating tank by enhancing the gas exchange action in the inside of the treating tank, and prevent the risk of inflammation by enhancing the gas discharge action in the inside of the treating tank.

Advantageous Effects of Invention

According to the present invention, it is possible to promote the drying in the inside of the treating tank because the gas exchange action in the inside of the treating tank can be enhanced compared with the conventional tissue piece treating apparatus, and prevent the risk of inflammation because the gas discharge action in the inside of the treating tank can be enhanced.

DESCRIPTION OF EMBODIMENTS

Figure 1:
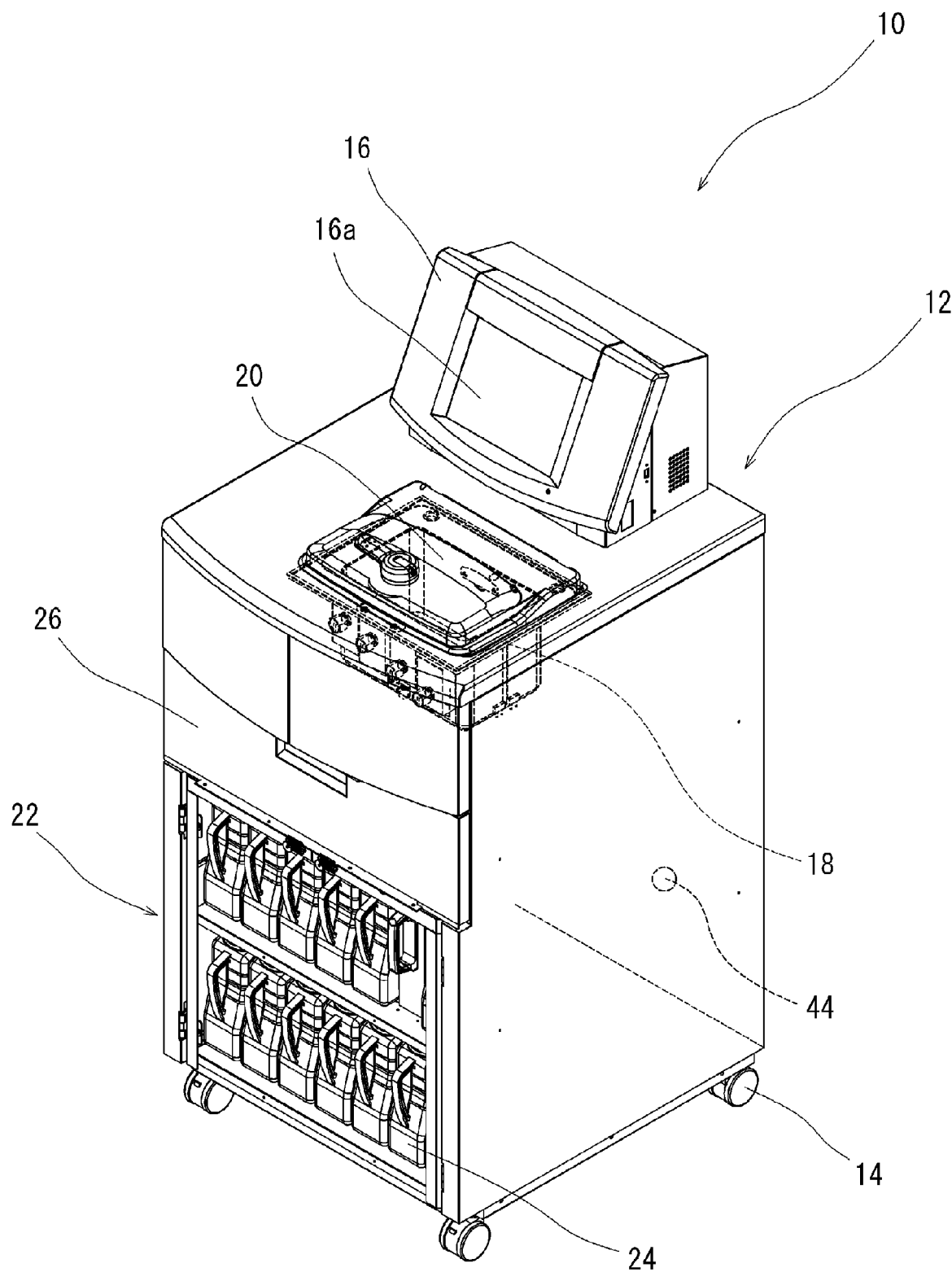
FIG. 1 is a schematic view (perspective view) illustrating an example of a tissue piece treating apparatus according to an embodiment of the present invention.
Figure 2:
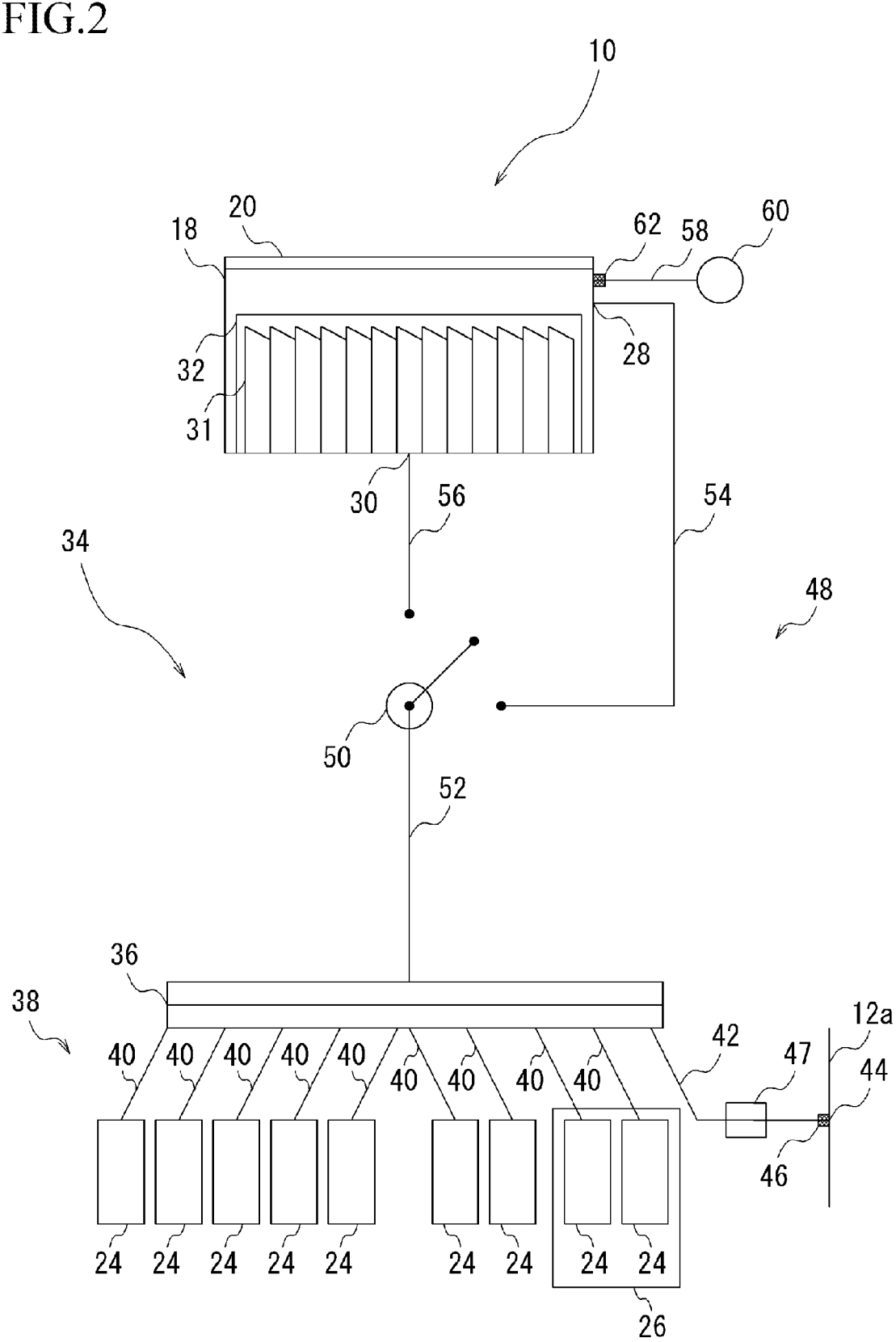
FIG. 2 is a schematic diagram (system diagram) illustrating an example of the tissue piece treating apparatus according to the embodiment of the present invention.

Hereinafter, an embodiment of the present invention will be described in detail with reference to the drawings. FIG. 1 is a schematic view (perspective view) illustrating an example of a tissue piece treating apparatus 10 according to an embodiment of the present invention. Moreover, FIG. 2 is a schematic diagram (system diagram) illustrating an example of the tissue piece treating apparatus 10 according to the embodiment of the present invention. In all the drawings, elements having the same function are assigned with the same reference numeral and repeated explanations thereof are omitted in some cases. Note that, "a chemical solution supplied and discharged to and from an inside of a treating tank 18" indicates that a chemical solution is supplied to an inside of the treating tank 18, and the chemical solution is discharged from the inside of the treating tank 18, and "an outside air supplied and discharged to and from the inside of the treating tank 18" indicates that an outside air is supplied to the inside of the treating tank 18, and the gas in the inside of the treating tank 18 is discharged from the inside of the treating tank 18. Moreover, the "chemical solution" includes paraffin, in addition to formalin, alcohol, xylene, and the like.

The tissue piece treating apparatus 10 according to the present embodiment (hereinafter, simply mentioned as "apparatus 10" in some cases) is an apparatus that automatically performs treatment necessary for producing a microscopic specimen of a tissue piece collected from a living thing including a human body. The tissue piece treating apparatus 10 illustrated in FIG. 1 is configured so as to be movable by mounting arbitrary casters 14 to a rectangular main body unit 12. A monitor 16 on which a setting screen, ongoing treatment, or the like, is displayed as one example, and a touch panel or the like is arbitrarily mounted, is provided to a top surface of the main body unit 12, and is arranged such that a display surface 16a is directed at a front surface of the main body unit 12 that faces a worker. Moreover, on the top surface of the main body unit 12, an opening/closing lid 20 that opens and closes an opening part in an upper portion of the treating tank 18 that is built into the main body unit 12 is mounted. Note that, the treating tank 18 is generally called "retort", and the opening/closing lid 20 is generally called "retort lid". Moreover, the reference numeral 44 indicates an outside air opening, which is described later.

Moreover, the main body unit 12 is provided with a bottle rack 22 of a plurality of stages (two stages in the present embodiment) at a lower portion in an inside thereof. In the bottle rack 22, as one example, a plurality of chemical solution bottles 24 that store therein formalin for performing fixing treatment, alcohol for performing dehydrating treatment, xylene for performing degreasing treatment, and the like are disposed.

Moreover, the main body unit 12 is provided with, in an inside thereof, an oven 26 that can heat and hold the inside at a constant temperature, in the central portion. In the oven 26, a plurality of chemical solution bottles 24 (see FIG. 2) that store paraffin for performing permeating treatment (embedding treatment) are disposed. This allows the paraffin that is solidified at an ambient temperature to hold in a fused state and to be waited for treatment. Note that, the holding temperature of the oven 26 is about 60[° C.] as one example.

Note that, as for the chemical solution bottles 24, in addition to bottles that respectively store chemical solutions of several types, a plurality of bottles that respectively store chemical solutions of the same type are disposed. Therefore, when the same treatment (for example, dehydrating treatment) is performed a plurality of times, chemical solutions can be respectively supplied from the different chemical solution bottles 24 to the inside of the treating tank 18, and can be respectively returned to the original chemical solution bottles 24. Accordingly, a plurality of the chemical solution bottles 24 that store therein chemical solutions of the same type and with the different degrees of degradation (concentration) can be disposed. As a result, these chemical solution bottles 24 are selectively used in accordance with a burden (the extent of the assumed concentration reduction) with the treatment, so that the degradation (concentration reduction) of the chemical solution is adjusted, and the number of use times of the chemical solution can be increased.

Moreover, the main body unit 12 is provided with the treating tank 18 in an upper portion in the inside thereof, as described above. The treating tank 18 is a container in which a tissue piece is immersed into chemical solutions of several types to perform specimen production treatment. In an inner surface thereof, a supply inlet 28 through which a chemical solution is supplied opens in a side surface, and a discharge outlet 30 from which the chemical solution is discharged opens in a bottom surface (see FIG. 2). Moreover, a heater (which is not illustrated) that heats the treating tank 18 is externally provided. Note that, each one or several tissue pieces are typically housed in a small-sized container 31, one or a plurality of the small-sized containers 31 are then housed in a storage container 32, and one or a plurality of the storage containers 32 are housed in the treating tank 18 (see FIG. 2). Therefore, tissue pieces collected from a plurality of human bodies and the like are housed in the treating tank 18 by being divided and housed into the small-sized containers 31 to which information related to the tissue pieces are attached, so that specimen production treatment can be simultaneously performed. Note that, the small-sized container 31 is generally called "cassette", and the storage container 32 is generally called "basket".

Subsequently, a configuration related to an operation of the tissue piece treating apparatus 10 according to the present embodiment will be described. The tissue piece treating apparatus 10 illustrated in FIG. 2 is provided with a communication passage 34 that is connected to the treating tank 18. The communication passage 34 includes an outside air port 42 that is a part of the communication passage 34 being branched and communicates with an outside of the apparatus 10, in other words, an outside air. In the present embodiment, as one example, as a part of the communication passage 34, a selection valve 36 in which a plurality of selection ports 38 are provided is provided. Note that, the number of the selection ports 38 is not limited. The selection ports 38 are configured such that a plurality of chemical solution ports 40 and at least one outside air port 42 are disposed, the plurality of the chemical solution ports 40 are connected on a one-to-one basis to the plurality of the chemical solution bottles 24, and the outside air port 42 is communicated with the outside of the apparatus 10, in other words, the outside air. Therefore, by the operation by the selection valve 36, it is possible to select the chemical solution port 40 or the outside air port 42, communicate the chemical solution bottle 24 or the outside of the apparatus 10 to the treating tank 18, and supply and discharge the chemical solution or the outside air to and from the inside of the treating tank 18 by receiving an action of a pump 60, which is described later. The selection valve 36, which is provided with the conventional apparatus 10, has been used for selection of the chemical solution bottles 24 as a rotary valve or the like. Therefore, with the configuration in the embodiment, the outside air port 42 is additionally disposed to one of the plurality of the selection ports 38 provided to the selection valve 36, so that the outside air port 42 can be provided more easily than the conventional configuration, and the manufacturing cost can be suppressed. Note that, the branch form of the outside air port 42 is not limited to the configuration in the embodiment, and as a modification example, for example, such a configuration or the like can be considered that the outside air port 42 that is branched from a central pipeline 48 connecting the treating tank 18 to the selection valve 36 is disposed.

Note that, the outside air port 42 communicates with the outside of the apparatus 10 through an outside air opening 44 that opens at an arbitrary position in an arbitrary wall surface 12a of the apparatus 10 (main body portion 12). Moreover, the outside air port 42 includes an filter 46 that cleans air. This allows the outside air taken from the outside air port 42 (the outside air opening 44) to be cleaned by passing the outside air through the filter 46. Accordingly, it is possible to supply the clean air to the inside of the treating tank 18, and prevent the inside of the treating tank 18 after cleaning from being re-contaminated by impurities contained in the outside air. Note that, the position, the number, the size, and the like of the filter 46 are not limited.

Moreover, the outside air port 42 is configured to be heated by a heating unit 47. This allows the outside air taken from the outside air port 42 (the outside air opening 44) when flowing through an inside of the outside air port 42 to be heated. Accordingly, it is possible to supply the heated outside air to the inside of the treating tank 18. Note that, the position, the number, the size, and the like of the heating unit 47 is not limited.

Moreover, the communication passage 34 is provided with the aforementioned central pipeline 48 that connects the treating tank 18 to the selection valve 36, and further provided with a switching valve 50 that is provided halfway through the central pipeline 48. The switching valve 50, which is a three-way valve, is connected via a central port 52 to the selection valve 36, is connected via a supply port 54 to the supply inlet 28 that opens in a side surface of the treating tank 18, and is connected via a discharge port 56 to the discharge outlet 30 that opens in a bottom surface of the treating tank 18. When a chemical solution or the outside air is supplied (transported) to the treating tank 18, the switching valve 50 causes the supply port 54 to be in an open state and the discharge port 56 to be a closed state, thereby communicating the selection valve 36 to the treating tank 18 (the supply inlet 28). Moreover, when the chemical solution or the gas is discharged (transported) from the treating tank 18, the switching valve 50 causes the discharge port 56 to be in an open state and the supply port 54 to be in a closed state, thereby communicating the treating tank 18 (the discharge outlet 30) to the selection valve 36. Moreover, when a tissue piece is immersed into the chemical solution in the inside of the treating tank 18 or the inside of the treating tank 18 is cleaned, the switching valve 50 causes the supply port 54 and the discharge port 56 to be in the closed state, thereby interrupting the treating tank 18 (the supply inlet 28 and the discharge outlet 30) from the selection valve 36.

Moreover, the tissue piece treating apparatus 10 is provided with the pump 60 that is connected to the treating tank 18 through a pump pipeline 58. When a chemical solution or the outside air is supplied (transported) to the treating tank 18, the pump 60 sucks the gas in the inside of the treating tank 18 to decompress the inside of the treating tank 18 to be a negative pressure. Moreover, when the chemical solution or the gas is discharged (transported) from the inside of the treating tank 18, the air is jetted to the inside of the treating tank 18 to pressurize the inside of the treating tank 18 to be a positive pressure. Note that, the pump pipeline 58 includes a filter 62 that cleans the air, as appropriate. Therefore, it is possible to jet the clean air to the inside of the treating tank 18, and prevent the inside of the treating tank 18 from being contaminated by impurities contained in the air. Note that, the position, the number, the size, and the like of the filter 62 are not limited.

Moreover, the selection valve 36, the switching valve 50, and the pump 60 are electrically connected to a controller (which is not illustrated) via respective wiring. The controller (which is not illustrated) to which an operation program is set in advance includes a CPU and a memory, and performs the control of the respective configurations on the basis of a set signal that is input from the aforementioned touch panel or the like. This allows the selection valve 36, the switching valve 50, and the pump 60 to operate in response to one another.

With the configuration in the foregoing, in the specimen production treatment, the cleaning treatment, and the drying treatment, the chemical solution or the outside air can be supplied and discharged to and from the inside of the treating tank 18. Specifically, firstly, in a case where a chemical solution is supplied and discharged, the desired chemical solution bottle 24 (chemical solution port 40) is selected by the operation of the selection valve 36, and a flow path from the chemical solution bottle 24 to the treating tank 18 is opened by the switching of the switching valve 50. Further, the inside of the treating tank 18 is decompressed by the pump 60, whereby the chemical solution in the chemical solution bottle 24 can be supplied (transported) to the inside of the treating tank 18. Next, the flow path between the treating tank 18 and the selection valve 36 is closed by the switching of the switching valve 50, whereby the chemical solution can be stored in the inside of the treating tank 18 to immerse a tissue piece, or the inside of the treating tank 18 can be cleaned. Then, the desired chemical solution bottle 24 (chemical solution port 40) is selected by the operation of the selection valve 36, and a flow path from the inside of the treating tank 18 to the chemical solution bottle 24 is opened by the switching of the switching valve 50. Further, the inside of the treating tank 18 is pressurized by the pump 60, whereby the chemical solution in the inside of the treating tank 18 can be discharged (transported) to the chemical solution bottle 24. In this manner, the chemical solution can be supplied and discharged to and from the inside of the treating tank 18. In addition, the supply and discharge can be performed in order by the control by the controller (which is not illustrated) with respect to the plurality of the chemical solutions (chemical solution bottles 24). As a result, the specimen production treatment of the tissue piece and the cleaning treatment in the inside of the treating tank 18 are capable of being performed.

Meanwhile, in a case where the outside air is supplied and discharged, the outside air port 42 is selected by the operation of the selection valve 36, and a flow path from the outside air opening 44 that opens to the outside of the apparatus 10 to the inside of the treating tank 18 is opened by the switching of the switching valve 50. Further, the inside of the treating tank 18 is decompressed by the pump 60, whereby the outside air can be supplied (transported) to the inside of the treating tank 18 through the communication passage 34. Next, the outside air port 42 is selected by the operation of the selection valve 36, and a flow path from the inside of the treating tank 18 to the outside air opening 44 that opens to the outside of the apparatus 10 is opened by the switching of the switching valve 50. Further, the inside of the treating tank 18 is pressurized by the pump 60, whereby the gas in the inside of the treating tank 18 can be discharged (transported) to the outside of the apparatus 10 through the communication passage 34. In this manner, the outside air can be supplied and discharged to and from the inside of the treating tank 18. In addition, the supply and discharge can be repetitively and continuously performed by the control by the controller (which is not illustrated). As a result, the drying treatment in the inside of the treating tank 18 is capable of being performed.

Here, in the conventional configuration, drying treatment in the inside of the treating tank 18 has been performed by an gas exchange action in the inside of the treating tank 18 by the pump 60 through the pump pipeline 58. However, the gas exchange action by the pump 60 is an action for merely attaining the purpose of pressurizing and decompressing the inside of the treating tank 18, and thus has been relatively weak with respect to the drying in the inside of the treating tank 18. In contrast, with the present embodiment, by the action of pressurizing and decompressing the inside of the treating tank 18 by the pump 60, the outside air taken from the outside air port 42 can be supplied to the inside of the treating tank 18 through the communication passage 34, and the gas in the inside of the treating tank 18 can be discharged through the communication passage 34 from the outside air port 42 to the outside of the apparatus 10, in other words, in the atmosphere. In other words, the gas exchange in the inside of the treating tank 18 can be performed on the same principle as the action of suppling and discharging the chemical solution in the chemical solution bottle 24 to and from the inside of the treating tank 18 by the pump 60, so that it is possible to flow the more gas through the inside and the outside of the treating tank 18 than the conventional configuration. Accordingly, it is possible to enhance the gas exchange action in the inside of the treating tank 18 and promote the drying in the inside of the treating tank 18.

Moreover, at a downstream process in the cleaning treatment, a chemical solution having a low flash point such as alcohol is supplied and discharged to and from the inside of the treating tank 18, and as a result, the inside of the treating tank 18 in the drying is filled with a flammable gas such as an alcohol gas. Accordingly, the insufficient gas exchange in the inside of the treating tank 18 causes a risk of inflammation in a case where the inside of the treating tank 18 is ignited due to an accident or the like. In contrast, with the present embodiment, it is possible to flow the more gas through the inside and the outside of the treating tank 18 than the conventional configuration. Accordingly, it is possible to enhance the gas discharge action in the inside of the treating tank 18, and prevent the risk of inflammation.

In addition, in the present embodiment, it is possible to supply warm air to the inside of the treating tank 18 by the aforementioned heating unit 47, and to further promote the drying in the inside of the treating tank 18. Moreover, it is possible to supply the clean air to the inside of the treating tank 18 by the aforementioned filter 46, and prevent the inside of the treating tank 18 after cleaning from being re-contaminated by impurities contained in the outside air.

Note that, neither the heating unit 47 nor the filter 46 is limited to the configuration of being provided to the outside air port 42. In other words, the heating unit 47 and the filter 46 may be provided to the communication passage 34 (between the treating tank 18 and the outside air (the outside air opening 44) that communicates via the outside air port 42) through which the outside air flows. Therefore, it is possible to heat and clean the outside air that flows through the communication passage 34 at any place in the communication passage 34, and supply the warm air and the clean air to the inside of the treating tank 18.

Moreover, as one example, such a configuration may be employed that a part or all of the central pipeline 48 or the outside air port 42 is laid in an inside or a vicinity of the aforementioned oven 26. This allows the oven 26 to act as the heating unit 47, and the outside air taken from the outside air port 42 (the outside air opening 44) to be heated by the heat from the oven 26. In this example, in the case where the central pipeline 48 is laid in the inside or the vicinity of the oven 26, as one example, such a configuration can be considered that a plurality of the central ports 52 are provided or the central port 52 is branched into two directions to provide a port through which the chemical solution flows and a port through which the outside air (gas) flows, and only the port through which the outside air (gas) flows is laid in the inside or the vicinity of the oven 26. Therefore, it is possible to heat the outside air and supply the warm air to the inside of the treating tank 18 when being dried, thereby promoting the drying, and prevent the chemical solution from easily evaporating by being heated when the chemical solution is supplied and discharged in the specimen production treatment.

As has been described in the foregoing, with the tissue piece treating apparatus according to the present invention, it is possible to include the outside air port that communicates with the outside air by branching the communication passage to be connected to the treating tank. Accordingly, by the action of pressurizing and decompressing the inside of the treating tank by the pump, the outside air taken from the outside air port can be supplied to the inside of the treating tank through the communication passage, and the gas in the inside of the treating tank can be discharged through the communication passage from the outside air port to the outside of the tissue piece treating apparatus, in other words, in the atmosphere. As a result, it is possible to flow the more gas through the inside and the outside of the treating tank 18 than the conventional configuration, promote the drying in the inside of the treating tank by enhancing the gas exchange action in the inside of the treating tank, and prevent the risk of inflammation by enhancing the gas discharge action in the inside of the treating tank.

In addition, the present invention includes the following technical concepts. In other words, the tissue piece treating apparatus according to the present invention includes: a treating tank in which a tissue piece is housed, and immersion of the tissue piece is performed by a chemical solution being supplied thereto; an outside air pipeline that communicates the treating tank with an outside air; and a pump that causes an inside of the treating tank to be a negative pressure or a positive pressure, in which the outside air pipeline is configured to be able to supply and discharge the outside air to and from the inside of the treating tank by receiving an action of the pump.

Accordingly, by the action of pressurizing and decompressing the inside of the treating tank by the pump, the outside air taken from the outside air pipeline can be supplied to the inside of the treating tank, and the gas in the inside of the treating tank can be discharged through the outside air pipeline to the outside of the tissue piece treating apparatus, in other words, in the atmosphere. As a result, it is possible to flow the more gas through the inside and the outside of the treating tank 18 than the conventional configuration, promote the drying in the inside of the treating tank by enhancing the gas exchange action in the inside of the treating tank, and prevent the risk of inflammation by enhancing the gas discharge action in the inside of the treating tank.

Here, the outside air pipeline that communicates the treating tank to the outside air is an upper-level concept including "the pipeline, being disposed in the communication passage, and being disposed between the treating tank and the outside air that is communicated via the outside air port" according to the aforementioned embodiment.

As another configuration example other than the above-mentioned embodiment, such a configuration may be employed that independent of the communication passage, an outside air pipeline that communicates the treating tank to the outside air is provided. With this configuration example, it is possible to set the length of the outside air pipeline more freely. Accordingly, for example, the length of the outside air pipeline is made relatively short, whereby a distance between the treating tank and the outside air can be shortened. As a result, it is possible to promote supply and discharge (circulation) of the outside air in the inside of the treating tank, and promote the drying in the inside of the treating tank.

Moreover, as another configuration example, such a configuration may be employed that a chemical solution bottle to be connected to the communication passage is caused to communicate with the outside air directly or through a pipeline, and a series of the pipeline that communicates from the treating tank through the communication passage, the chemical solution bottle, and the like to the outside air is used as the outside air pipeline. With this configuration example, it is possible to form an outside air pipeline extremely easily, for example, with a configuration in which a ventilation opening is provided to the chemical solution bottle, with a configuration in which a pipeline that communicates with the outside air is connected to the ventilation opening, or the like. Accordingly, the manufacturing cost can be suppressed. Note that, as for supply and discharge of the chemical solution in the inside of the treating tank and the outside air, the chemical solution or the outside air can be selectively supplied and discharged by adjusting the output of the pump.

Note that, the present invention is not limited to the examples having been described above, but various changes can be made without deviating from the scope of the present invention.

What is claimed is:

1. A tissue piece treating apparatus comprising:
   a treating tank configured to house a tissue piece and to immerse the tissue piece in a chemical solution supplied to the treating tank;
   a communication channel connected to the treating tank;
   one or more chemical solution bottles connected to the treating tank through the communication channel, and configured to store one or more chemical solutions to supply to the treating tank; and
   a pump configured to supply the one or more chemical solutions from the one or more chemical solution bottles to the treating tank by decreasing a first pressure inside the treating tank in a first action of the pump wherein the first pressure inside the treating tank is negative relative to a second pressure outside the treating tank, and to discharge a chemical solution from the treating tank to the one or more chemical solution bottles by increasing the first pressure inside the treating tank in a second action of the pump wherein the first pressure inside the treating tank is positive relative to the second pressure outside the treating tank, wherein the communication channel includes, by branching, an outside-air port in fluidically communication with air outside the treating tank, and configured to supply air from the outside-air port to the treating tank in response to the first action of the pump and to discharge air from the treating tank to the outside port in response to the second action of the pump; and
   a heating unit disposed in the communication channel between the treating tank and the outside-air port.

2. The tissue piece treating apparatus according to claim 1 wherein the communication channel includes (i) a selection valve comprising a plurality of selection ports, (ii) a central pipeline connecting the selection valve to the treating tank, (iii) one or more chemical solution ports connected on a one-to-one basis to the one or more chemical solution bottles, and wherein the outside-air port is disposed in one selection port of the plurality of the selection ports, so that a chemical solution in one chemical solution bottle selected from the plurality of the chemical solution bottles can be supplied to the treating tank, a chemical solution inside the treating tank can be discharged from the treating tank to the one or more chemical solution bottles, air can be supplied from the outside-air port to the treating tank and air inside the treating tank can be discharged from the treating tank to the outside-air port.

3. The tissue piece treating apparatus according to claim 2, further comprising an oven configured to heat paraffin, and wherein the central pipeline includes a part and wherein the part or all of the central pipeline or the outside-air port is laid inside the oven or proximal to the oven.

4. The tissue piece treating apparatus according to claim 1, wherein the outside-air port includes a filter configured to clean air.

5. A tissue piece treating apparatus comprising:
   a treating tank configured to house a tissue piece and to immerse the tissue piece in a chemical solution supplied to the treating tank;
   a communication channel connected to the treating channel and including an outside-air port by branching;
   an outside-air pipeline fluidically communicating the treating tank to air outside the treating tank through the outside-air port;
   a pump configured to decrease a first pressure inside the treating tank in a first action of the pump wherein the first pressure is negative relative to a second pressure outside the treating tank and to increase the first pressure inside the treating tank in a second action of the pump wherein the first pressure inside the treating tank is positive relative to the second pressure outside the treating tank, wherein the outside-air pipeline is configured to supply air to the treating tank in response to the first action of the pump and to discharge air from the inside of the treating tank in response to the second action of the pump; and
   a heating unit disposed in the communication channel between the treating tank and the outside-air port.

* * * * *